(12) United States Patent
Wilt

(10) Patent No.: US 6,792,131 B2
(45) Date of Patent: Sep. 14, 2004

(54) SYSTEM AND METHOD FOR PERFORMING SPARSE TRANSFORMED TEMPLATE MATCHING USING 3D RASTERIZATION

(75) Inventor: Nicholas P. Wilt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 09/777,644

(22) Filed: Feb. 6, 2001

(65) Prior Publication Data

US 2002/0131640 A1 Sep. 19, 2002

(51) Int. Cl.[7] .................................................. G06K 9/00
(52) U.S. Cl. ...................................... 382/103; 382/108
(58) Field of Search ............................... 382/103, 108, 382/159, 160, 165, 209, 218, 219, 224, 228, 276, 305, 190, 294, 295; 348/128, 169; 345/582, 552, 208.14

(56) References Cited

U.S. PATENT DOCUMENTS

| | | | | |
|---|---|---|---|---|
| 4,586,038 A | * | 4/1986 | Sims et al. | 345/586 |
| 5,319,744 A | * | 6/1994 | Kelly et al. | 345/647 |
| 5,696,892 A | * | 12/1997 | Redmann et al. | 345/582 |
| 5,852,443 A | * | 12/1998 | Kenworthy | 345/441 |
| 5,872,867 A | * | 2/1999 | Bergen | 382/254 |
| 6,100,925 A | * | 8/2000 | Rosser et al. | 348/169 |
| 6,353,679 B1 | * | 3/2002 | Cham et al. | 382/228 |
| 6,532,013 B1 | * | 3/2003 | Papakipos et al. | 345/426 |
| 2001/0031067 A1 | * | 10/2001 | Kennedy et al. | 382/103 |
| 2001/0046321 A1 | * | 11/2001 | Murakawa | 382/190 |
| 2002/0005853 A1 | * | 1/2002 | Fujimura et al. | 345/582 |
| 2002/0045153 A1 | * | 4/2002 | Kaufman et al. | 434/262 |

* cited by examiner

*Primary Examiner*—Andrew W. Johns
*Assistant Examiner*—Shervin Nakhjavan
(74) *Attorney, Agent, or Firm*—Lyon & Harr, LLP; Mark A. Watson

(57) ABSTRACT

The present invention is embodied in a system and method for performing sparse transformed template matching using three dimensional rasterization by comparing and matching a first set of digital data to at least a second set of digital data. The system and method includes raster transforming at least one of the first set of digital data and the second set of digital data, placing multiple images of the digital data in texture memory as multiple textures, gathering statistics between the textures and statistically comparing and matching the raster transformed sets of digital data to appropriately corresponding portions of each other. The first or the second set of digital data can be transformed during statistical analysis to enhance statistical analysis of the digital data.

20 Claims, 10 Drawing Sheets

FIG. 9A
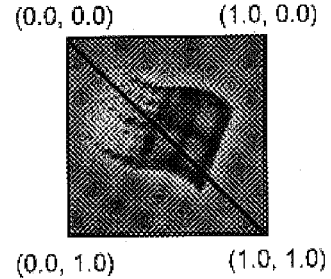
FIG. 9B
FIG. 9C
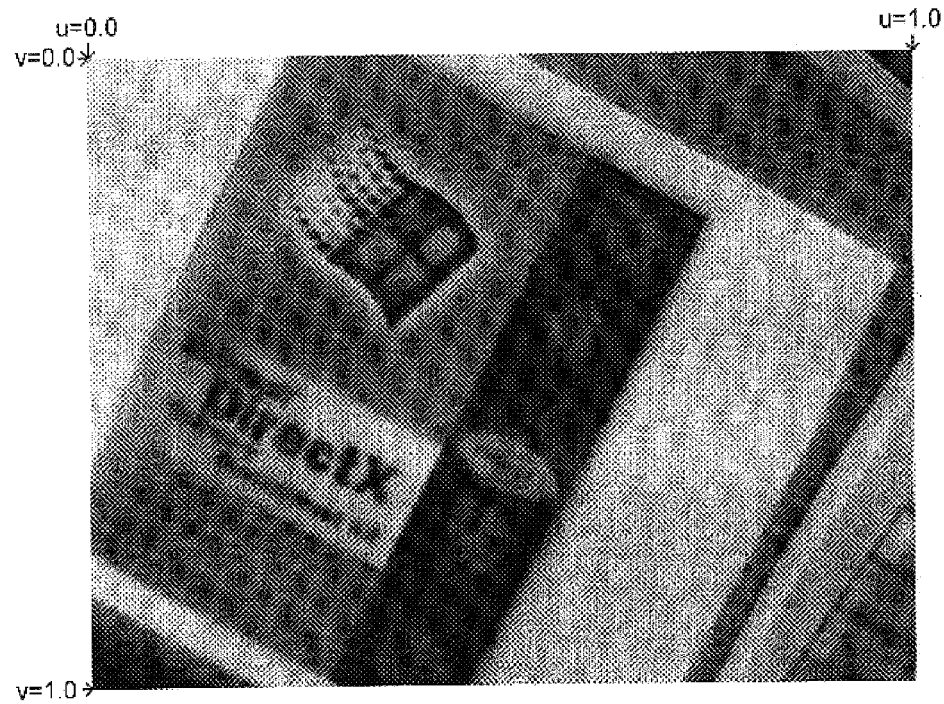
FIG. 9D

SYSTEM AND METHOD FOR PERFORMING SPARSE TRANSFORMED TEMPLATE MATCHING USING 3D RASTERIZATION

BACKGROUND OF THE INVENTION

1. Field of the Invention

The present invention relates in general to object detection and tracking, and in particular to a system and method for performing sparse transformed template matching using three dimensional (3D) rasterization by statistically comparing and matching plural sets of digital data.

2. Related Art

Applications for automatic digital object detection and tracking, image registration, pattern recognition and computer vision analysis are becoming increasingly important for providing new classes of services to users based on assessments of the object's presence, position, trajectory, etc. These assessments allow advanced and accurate digital analysis (such as pattern recognition, motion analysis, etc.) of the objects in a scene, for example, objects in a sequence of images of a video scene. Plural objects define each image and are typically nebulous collections of pixels, which satisfy some property. These pixels could be the result of some pre-processing operation such as filtering, equalization, edge or feature detection, applied to raw input images. Each object can occupy a region or regions within each image and can change their relative locations throughout subsequent images of the video scene. These objects are considered moving objects, which form motion within a video scene and can be automatically detected and tracked with various techniques, one being template matching.

Template matching is a class of computer algorithms that is used in many digital computer applications, such as image registration, pattern recognition and computer vision applications. A template matching algorithm defines a function (for example, a metric) that estimates the similarity between sets of digital data. In this case, one set of digital data is commonly referred to as a template and another set of digital data is referred to as an image, wherein the template is typically smaller than the image (for instance, the template can be a small portion of the image). In computer vision applications, the template usually represents an object of the image that is being tracked and detected (located) within the image. The object can be located by computing the metric at various locations (u, v) in the image and determining where the metric is maximized.

However, many systems that use template matching are not robust or flexible enough for advanced image registration, pattern recognition and computer vision applications due to unfavorable tradeoffs of functionality for performance (for example, restricting themselves to translations of the template). Therefore, what is needed is a system and method for comparing and matching multiple sets of data by transforming one set of data and performing statistical analyses on the multiples sets of data. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for performing sparse transformed template matching using three dimensional rasterization by comparing and matching a first set of digital data to at least a second set of digital data.

In general, the system and method includes raster transforming at least one of the first set of digital data and the second set of digital data, placing multiple images of the digital data in texture memory as multiple textures, gathering statistics between the textures and statistically comparing and matching the raster transformed sets of digital data to appropriately corresponding portions of each other. The first or the second set of digital data can be transformed during statistical analysis to enhance statistical analysis of the digital data. As such, the present invention can automatically track and detect digital data in a digital scene. This is accomplished by transforming data representing either the elements to be tracked, such as objects, or the elements to be matched to the objects and simultaneously comparing and matching the objects to the scene.

In one working example embodiment of the present invention, the system includes a host processor executing software that implements an address generator, an acceptance tester and a statistical comparison processor. The host processor controls the entire process and initially renders or rasterizes the sets of data. The address generator generates addresses, which can reflect a transformation, for the first set of data and the second set of data to be compared. The addresses are used by filtering functions to generate per-pixel values, such as color values. The acceptance tester receives the per-pixel values and determines the pixels that are to be used to contribute to statistical analysis. The statistical comparison processor statistically analyzes the pixels between the first data set and the second data set for comparison purposes. The host processor then examines the statistical comparisons computed by the statistical comparison processor and makes further processing decisions. The process repeats until a desired result is computed, such as a match or non-match between the data sets.

Alternatively, the system can be implemented in a three-dimensional (3D) graphics rasterizer. In this embodiment, the system includes a frame buffer (a block of graphics memory that represents the display screen) and texture memory (a block of graphics memory that can contain portions of the display screen), in addition to the components discussed above. The first set of digital data can be stored in the frame buffer while the second set of data can be stored in the texture memory. Also, statistical generation can be performed by the rasterizer, with or without actually rendering or writing a 3D digital scene comprised of the digital data to the frame buffer.

In another working example, the system tracks the digital objects as templates within a digital image scene with a robust and flexible processing scheme. For example, in this embodiment, the system includes a rasterization processor that resamples either the templates or digital data of the scene to be matched to the templates using a perspective transformation. In one specific embodiment of this working example, multiple images can be placed in texture memory as multiple textures. Certain statistics can be gathered between textures for normalized correlation or other statistics can be recorded for variations and subsequent forwarding to a host processor.

This embodiment allows the images participating in the comparison to benefit from increased flexibility of texture coordinates and an increased efficiency of mipmapping and other optimizations for texture filtering. In addition, it's scalable so that additional images can participate in a single statistics gathering operation simply by adding more texture stages. In another specific embodiment of this example, a hardware processor can be used with additional core logic to compute the statistics and a feedback mechanism can be used to forward the results back to the host upon request.

In all embodiments, rasterization and rendering techniques and advanced statistical generation and comparison of the present invention can be integrated to form a novel video graphics device or hardware video card for computer systems.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 9A–9E are graphical images illustrating a working example of the alternative embodiment of FIG. 7.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Operating Environment

Figure 1:
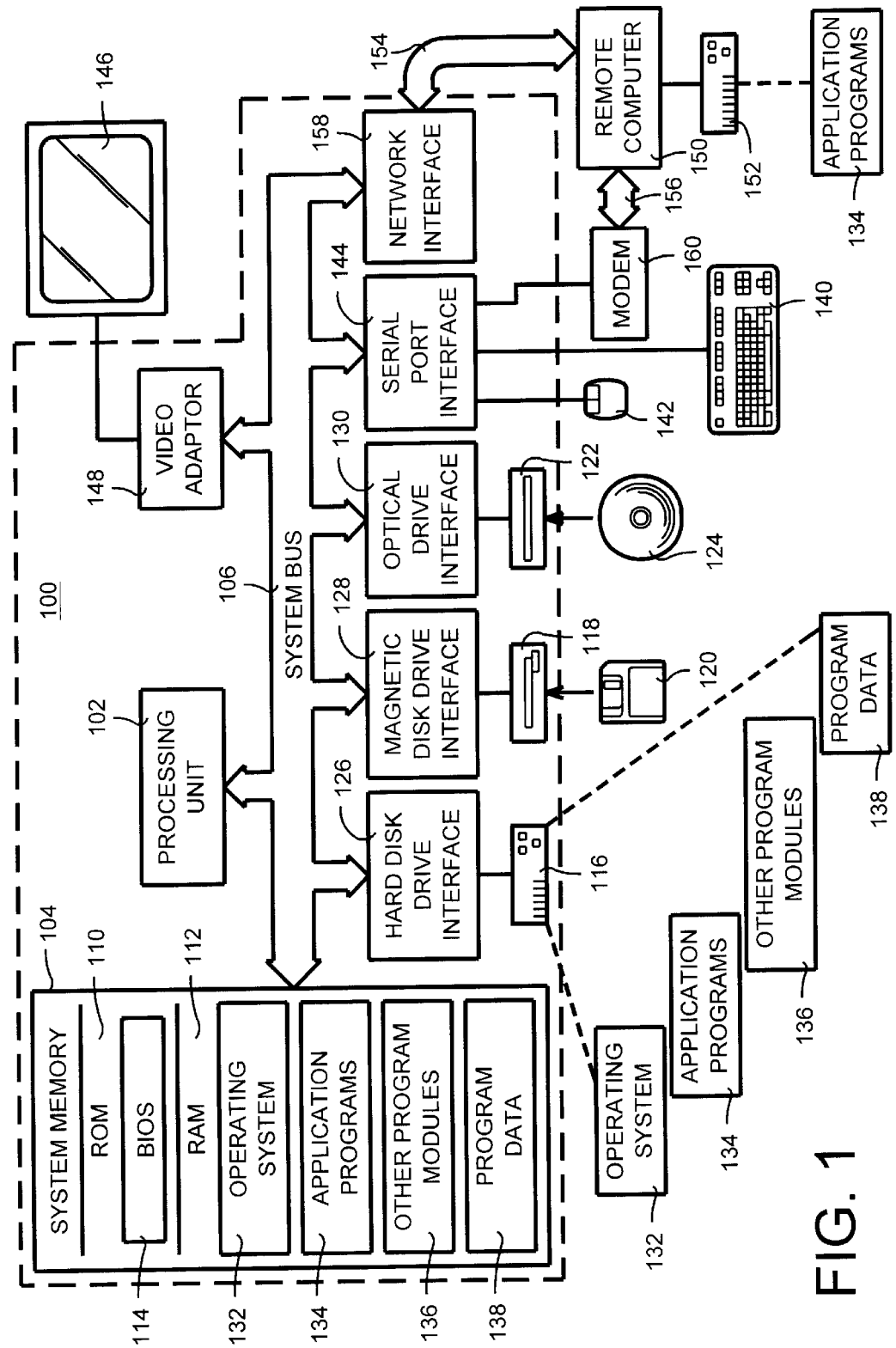
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used.

II. General Overview

In general, the present invention is embodied in a system and method for statistically analyzing and comparing a first group of pixels of a defined portion of a digital scene, such as an object or template within the digital scene, to a second group of pixels, such as the entire digital scene or the image. The template is matched to appropriately corresponding portions of the image that represent the template. During statistical comparison and matching of the template and the image, either the first or the second group of pixels can be raster transformed. For instance, either the template or the image can be incrementally rotated or skewed to enhance the statistical analyses.

In particular, first, the system receives digital input, such as the images or the templates. This data can then be pre-processed, using a variety of techniques such as filtering, equalization, and edge or feature finding. The system then computes statistics on either transformed images or transformed templates. Next, the resulting computed statistics are analyzed and new requests based on the resulting statistics are generated with different transformations and/or different images until a desired result is computed, namely a match or non-match between the template and the image.

The present invention can be used as an object detection and tracking system for computer vision, motion analysis and pattern recognition applications, as a video acceleration system for computer graphics video hardware cards, as a video CODEC (coder/decoder), or any other suitable device that can utilize statistical comparison and matching between sets of digital data, such as images. In addition, the present invention can be implemented as computer software running on a computer system, as instruction sets operating within a microprocessor for a hardware device, such as a computer graphics video card, as computer firmware operating within a digital device, such as a digital camera, or any other suitable digital processing system.

Figure 2:
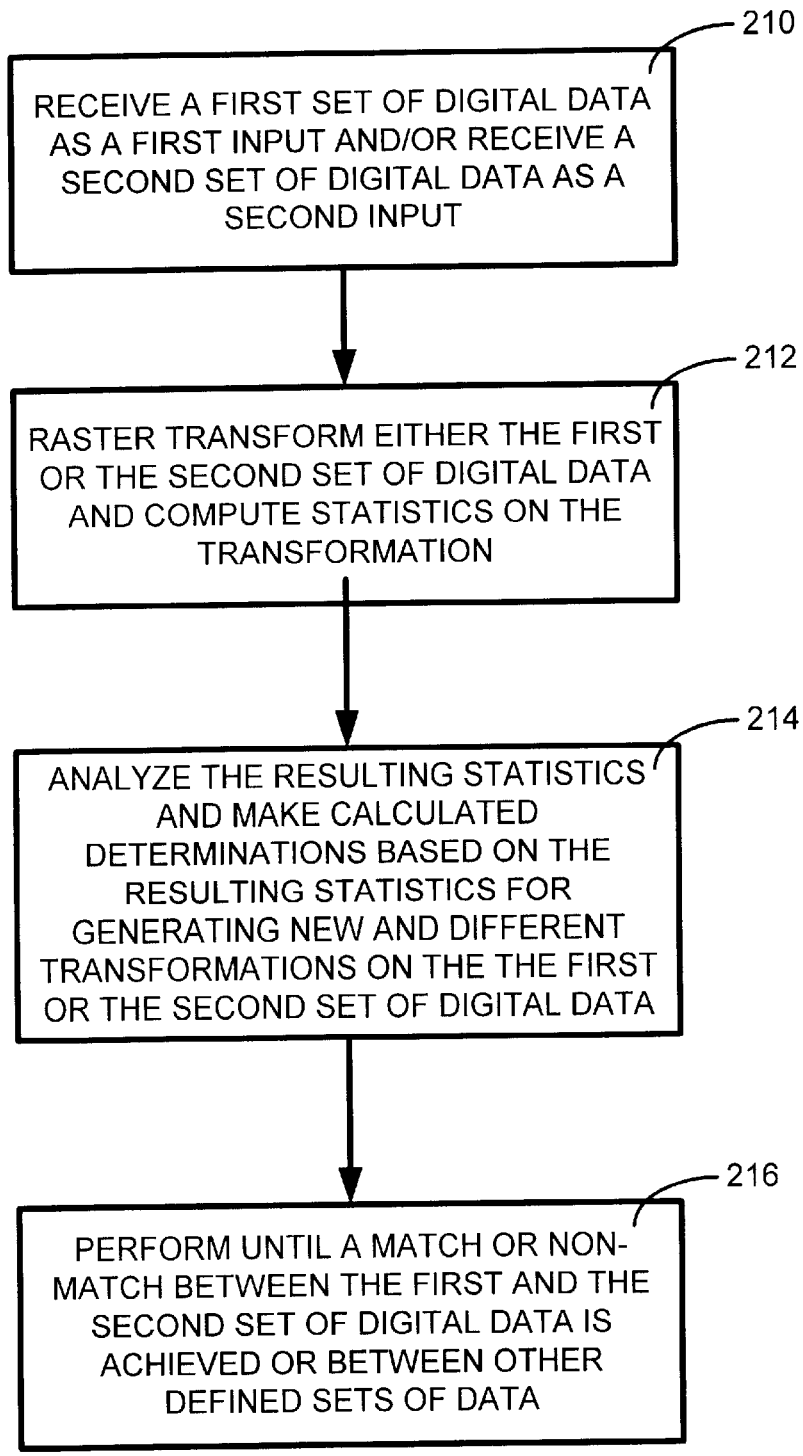
FIG. 2 is an overview flow diagram of the present invention.

FIG. 2 is an overview flow diagram of the system and method of the present invention. In general, the present invention matches a first set of digital data to a second set of digital data by statistically comparing the sets of data. Namely, first the system receives a first set of digital data as a first input, which can be a template, and/or receives a second set of digital data as a second input, which can be an image (step 210). Next, the system 200 raster transforms either the first or the second set of digital data and computes statistics on the transformation (step 212). The system then analyzes the resulting statistics and makes calculated determinations based on the resulting statistics for generating new and different transformations on the data (step 214) until a desired result is achieved, such as a match or non-match between the first and the second set of digital data (step 216) or between other sets of data.

III. Details of Components and Operation

Figure 3:
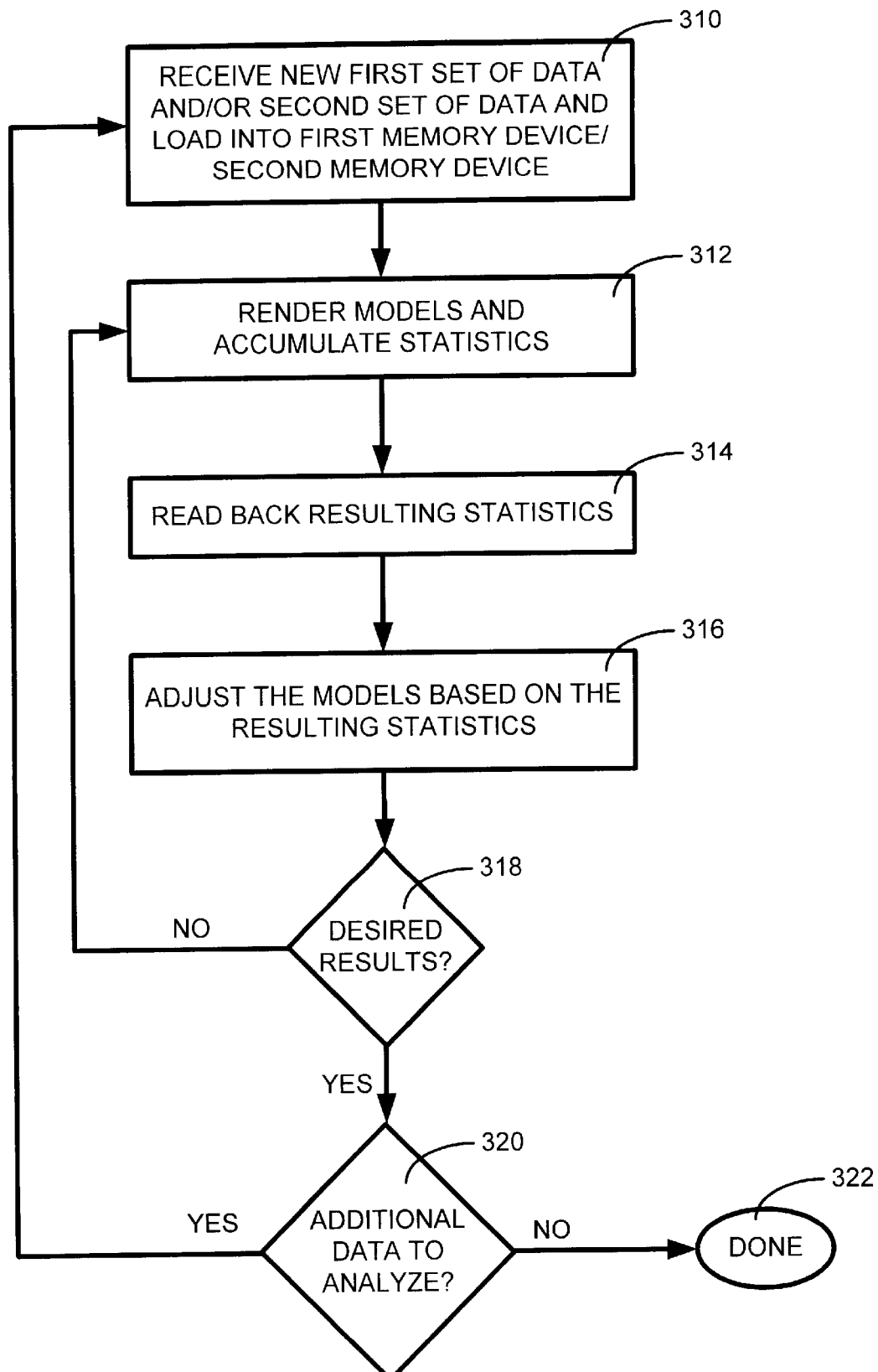
FIG. 3 is a flow diagram of the operation of the present invention.
Figure 4:
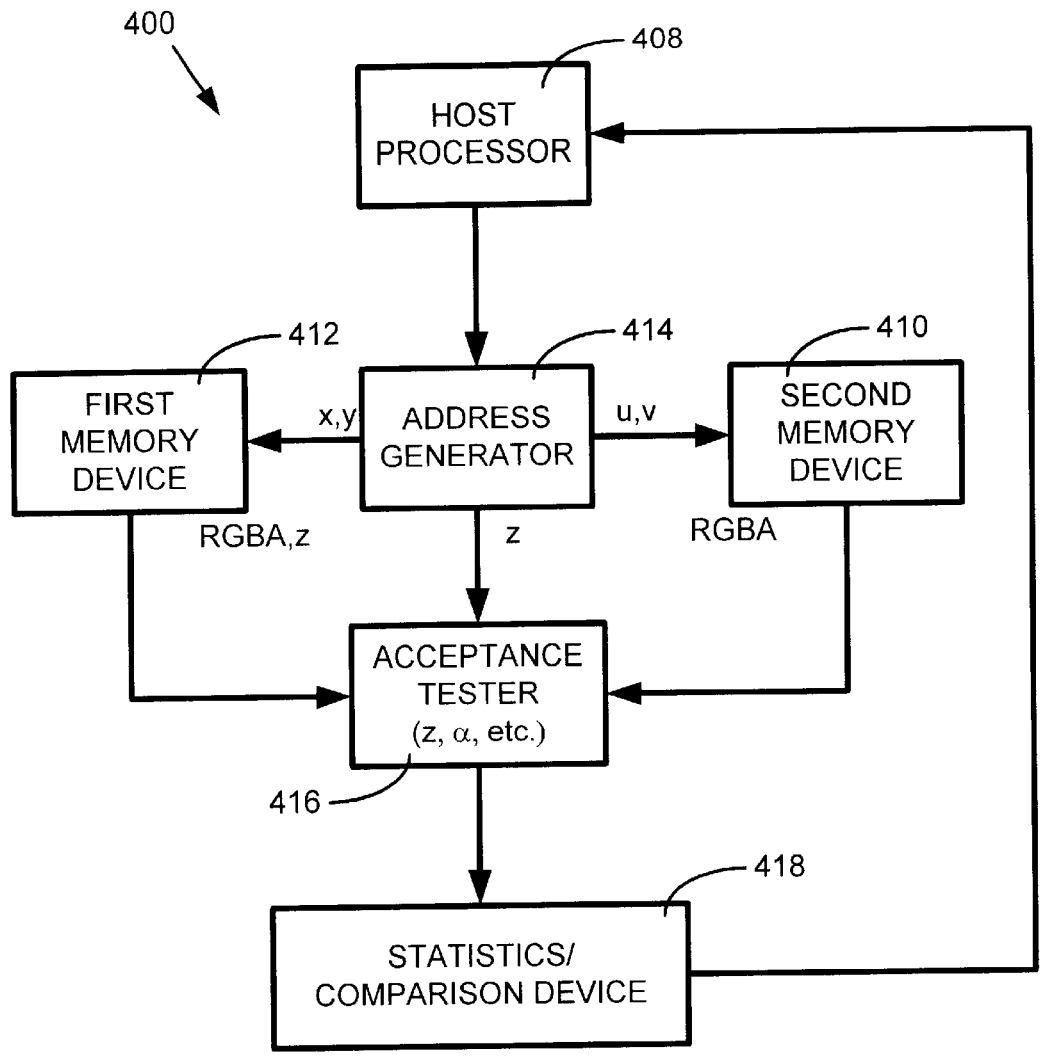
FIG. 4 is a general block diagram of the present invention.

FIG. 3 is a flow diagram of the operation of the present invention and FIG. 4 is a general block diagram of the present invention. Referring to FIG. 3 along with FIGS. 4 and 2, first, new sets of data, such as an image and/or a template is acquired (step 310) by the system 400 and initialized by the host processor 408. The host processor 408 can store the new sets of data in the memory devices. For instance, the first set of data, such as the template can be loaded into a first memory device 410 and the second set of data, such as the image can be loaded into a second memory device 412. Second, models, such as two-dimensional (2D) or three-dimensional (3D) models, are rendered and statistics are accumulated (step 312) by the host processor 410 for the template and the image. Rendering and statistical accumulation can be accomplished with an address generator 414 and an acceptance tester 416, which will be discussed in detail below.

Rendering involves drawing geometric shapes or primitives, such as polygons, into dedicated memory. It should be noted that the present invention preferably uses triangles as the drawing primitive, although there are other primitive types that could be used. In general, a single triangle can be rendered by taking three vertices $v_0$, $v_1$, $v_2$ with the following fields sx sy (the screen space coordinates of the triangle in the first memory device) tu tv rhw (the 2D coordinates of each vertex in the texture, and a perspective term). The address generator 414 interpolates these parameters across the triangle; for each pixel in the first memory device subtended by the triangle in screen space (sx sy), the second memory device is used to compute an interpolated texture value at the corresponding interpolated texture location. The comparison statistics between the two colors are then gathered, depending on the results of the acceptance test. This operation can be considered as a resampling operation being applied to the texture, which involves filtering the texture at different locations and at different densities.

Third, the host processor 408 reads back resulting statistics (step 314) from the statistics/comparison device 418 and adjusts the 2D/3D models based on the resulting statistics (step 316). Steps 312–316 are repeated as long as the desired iterations or quality for matching are not achieved (step 318). When the desired iterations or quality for matching are achieved and if additional images or templates need to be analyzed, steps 310–316 are performed (step 320). However, if no additional images or templates need to be analyzed after the desired iterations or quality for matching are achieved, then the matching or non-matching results are completed (step 322).

In general, the address generator 414 generates addresses for the template and the image that are to be compared. The addresses can reflect a transformation, such as combinations of rotations, scales and perspective transforms, of the template or image. The addresses serve as input to filtering functions that read from the images to be compared and generate color values (RGBA) and, if present, Z buffer and other per-pixel values. These values can be used by the acceptance tester 416 to decide whether to allow the pixel to contribute to the statistics. If the pixel is permitted to contribute, the color values are sent to a statistics/comparison device 418 for statistical analyses and comparison processing.

The statistics/comparison device 418 can contain variables that are updated for each pixel based on the input color values. For instance, in one embodiment of the present invention, statistical analyses for comparing and matching the sets of digital data can be accomplished by initially defining a function or metric that estimates the similarity between the sets of digital data. In this case, one set of digital data is the template and the other set of digital data is the image. The template can represent an object of the image that is being tracked and detected (located) within the image. The object can be located in the image by computing the metric at various locations (u, v) in the image and determining where the metric is maximized.

In the following examples, T represents the template image and I represents the input image. One metric that can be used is a cross-correlation coefficient, which measures the similarity between the image and the template on an absolute scale in the range [−1, 1], namely:

$$\frac{\text{covariance}(I, T)}{\sigma_I \sigma_T} =$$

$$\frac{\sum_x \sum_y (T(x, y) - \mu_T)(I(x - u, y - v) - \mu_I)}{\sqrt{\sum_x \sum_y (I(x - u, y - v) - \mu_I)^2 \sum_x \sum_y (T(x, y) - \mu_T)^2}}$$

where $\mu_I$ and $\sigma_I$ designate the mean and standard deviation of the image and $\mu_T$ and $\sigma_T$ designate the mean and standard deviation of the template.

Example variables and computations that can be tracked by the statistics/comparison device 418 are illustrated below. To compute the statistic, the following sums can be calculated between the template (T) and corresponding pixels in the image (I):

1) $\Sigma I$ and $\Sigma T$, the sums of the respective pixel values
2) $\Sigma IT$, the sum of the product of the pixel values
3) $\Sigma I^2$ and $\Sigma T^2$ the sums of the squares of the respective pixel values
4) Pixel Count, the number of pixels that have been accumulated It should be noted that computing these sums can dominate the runtime of the pattern recognition or other high-level algorithm that is using the metric.

Also, a summing metric for template matching can be used that involves summing some function of the difference between the image and template pixels, for example:

$$f(I, T) = \begin{cases} (I - T)^2, & |I - T| \le \delta \\ |I - T|, & \text{otherwise} \end{cases}$$

where $\delta$ is some value less than 20 (for 8-bit unsigned integer pixel data). A more flexible variation involves computing $\Sigma LUT(f(I,T))$, the sum of a lookup based on a function of the pixel values. Two examples of f(I,T) are f(I,T)=I−T or f(I,T)=|I−T| (the difference and absolute difference of the pixel values, respectively).

As mentioned above, a transform can be applied to either the input image or the template, in order to find transformed versions of the template object. Typical transformations can be combinations of rotations, scales and perspective transforms that are relatively close to identity (to minimize the size of the search space). All of the above-described variations share the characteristic that pixels from the template are iterated over pixels in the image, and a calculation is performed between corresponding pixels. The template is typically small compared to the image and static over a large number of template matching search probes.

Several higher-level search strategies can be used to find the best transformation parameters for a given template. One involves examining all possible combinations of parameters, e.g., examine the template at all possible positions, orientations, and scales. Some savings can be obtained by working in a multi-resolution hierarchy, i.e., to match a reduced size template to a reduced size image, and to then try local variations (perturbations) to find a better match.

Another strategy that can be used involves taking derivatives of the matching cost with respect to the unknown parameters, and then using a generalized gradient descent technique. In this case, in addition to summing intensities, (threshold) intensity differences, and intensity products or squares (as in regular, normalized, or robust enhanced cross-correlation), also products of horizontal and vertical derivatives are accumulated with themselves and with the per-pixel difference. If transformations other than translation are being estimated, the number of required derivatives and products rise quickly. However, it is possible to amortize the computation of derivatives that are more complicated and their products by dividing the template up into smaller regions or patches, and only accumulating simpler derivatives and products on a per-pixel basis.

An additional strategy that can be used is to let the unknown transformation parameters (or at least their updates) be controlled by the motion of vertices embedded in the template. For example, the template can be a wireframe mesh of an object that is being tracked. The control mesh can be discretized into finer polygons, such as triangles, and the triangles surrounding each control vertex can be used to estimate that vertex's motion. For reasonably textured templates, convergence will occur to the same estimate as the full gradient descent techniques, which explicitly model the interaction between vertices controlling a common patch or triangle.

In addition, the alpha values in the input colors can be used to weight the statistics. For example, if $\alpha_T$ is the template alpha and $\alpha_I$ the image alpha, then a new $\alpha$ can be derived from these values by selecting one, or by doing a weighted blend between them. The resulting $\alpha$ could then be used to weight the pixel's contribution to the above-described statistics. Among other things, this would allow pixels to be importance-weighted by the application.

V. Working Example

Figure 5:
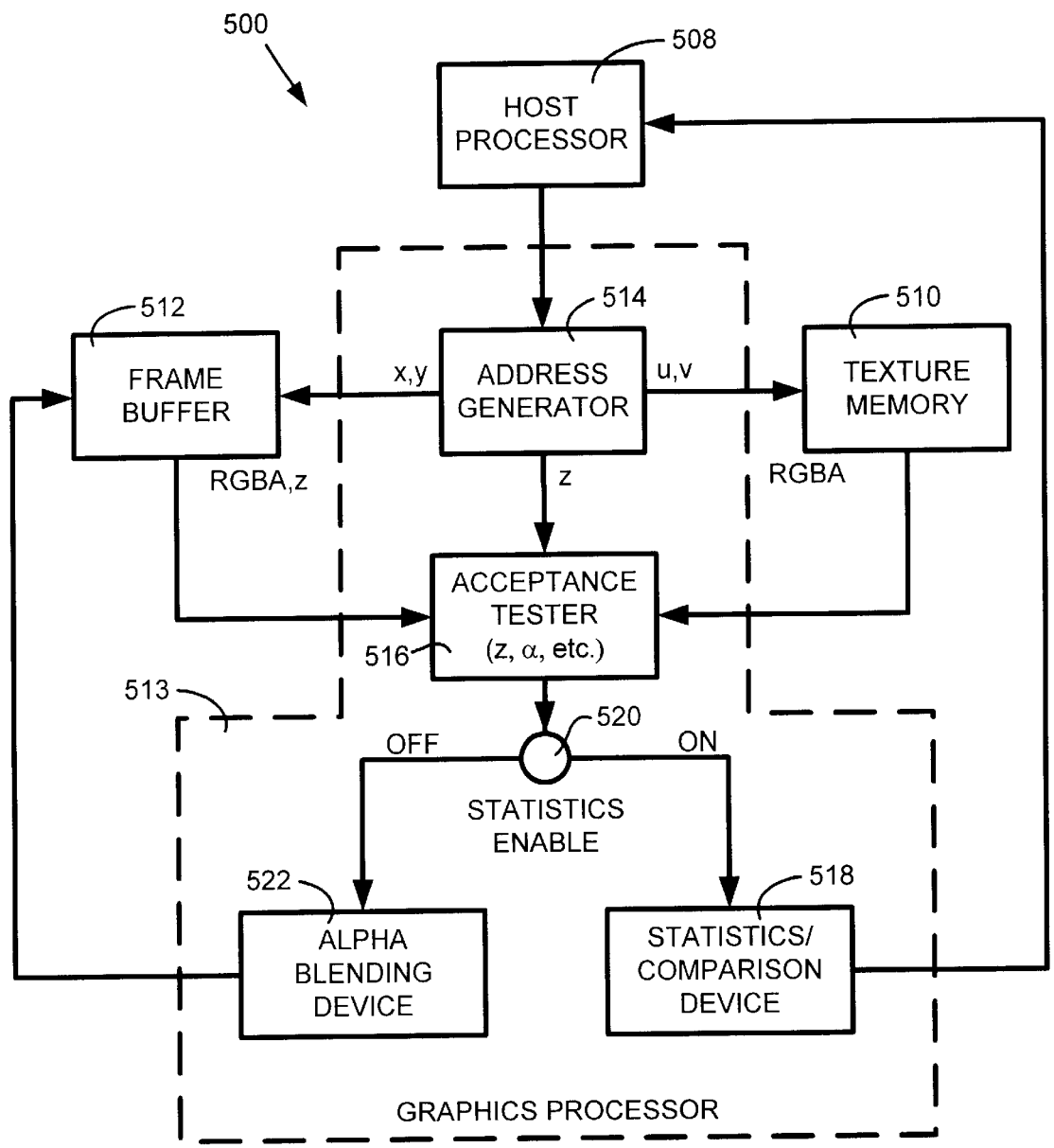
FIG. 5 is a block diagram illustrating one embodiment of the present invention.

The following working example is for illustrative purposes only. FIG. 5 is a block diagram illustrating one embodiment of the present invention. In general, similar to FIG. 4, the example system 500 of FIG. 5 includes a host processor 508, a first memory device 512, such as a frame buffer, a second memory device 510, such as a texture memory device, and a graphics processor 513 that includes an address generator 514, an acceptance tester 516 and a statistics/comparison processor 518. The frame buffer 512 can be a block of graphics memory that represents a display for a computer screen and texture memory 510 can be a block of graphics memory that can contain portions of the display screen. In addition, the example system 500 of FIG. 5 also includes a statistics enable switch 520 and an alpha blending device 522. In this example, the graphics processor 513 resamples either the first or the second set of data to be matched to each other using a perspective transformation.

Preferably, this example system can be used as a three-dimensional (3D) graphics rasterizer that can be integrated to form a novel video graphics device or hardware video card for computer systems. In this embodiment, the first set of digital data can be stored in the texture memory while the second set of data can be stored in the frame buffer. Also, statistical generation can be performed with or without actually rendering or writing a 3D digital scene to the frame buffer with the statistics enable switch 520. For implementation of the computer video graphics hardware device, additional core logic can be used to compute the statistics and to forward the results back to the host processor 508 upon request. FIG. 5 shows computations of the statistics between the texture map and the frame buffer image for tracking statistics on the two input pixel values instead of blending between them and writing the result to the frame buffer.

Namely, when the statistics enable switch 520 is enabled, the graphics processor 513 renders the rasterized information (step 220 of FIG. 2) without writing the results to the frame buffer. In contrast, when the statistics enable switch 520 is disabled, the graphics processor 513 actually renders or writes the rasterized information to the frame buffer and display screen. The alpha blending device 522 allows use of an additional (such as a fourth) color component that is not displayed, but that corresponds to the opacity of a surface. This provides control of the amount of color of a pixel in the source surface to be blended with a pixel in the destination surface.

In one specific embodiment of the example of FIG. 5, the template is treated as a texture and the frame buffer an image and the display primitive for rendering purposes is a triangular polygon. In addition, instead of rasterizing the texture into the frame buffer, certain statistics can be recorded for normalized correlation or other statistics can be recorded for variations. In one example, if the texture is considered a template and the frame buffer an image, the graphics processor 513 can be used to resample the template using a perspective transformation. Also, the graphics processor 513 can be used to record statistics ($\Sigma T$, $\Sigma I$, $\Sigma IT$, $\Sigma T^2$, $\Sigma I^2$ for normalized correlation, or other statistics for a variation) for later forwarding to the host processor.

The example system 500 is extremely flexible because it has the ability to intersperse rendering/accumulation commands with accumulator readback commands. For example, if a deformable triangular patch is being tracked, the triangle can be rendered using smaller triangles (such as 16), and the accumulator can read back after each of the small triangles has been rendered. This allows host processor 508 to compute necessary derivatives and sums to compute a full affine motion for the triangle. Similarly, if a full set of data is being tracked, each triangle's accumulated values can be read back in order to compute an independent motion of each control vertex. The number of readbacks per rendered model are few enough that they should not impose a large burden on a hardware graphics port of a computer system, such as the exemplary computer system depicted in FIG. 1.

Either the first or the second set of data to be compared with each other can be rendered at a number of offsets. This allows the host processor 508 to either explicitly find the best position for the first set of data, such as the template, or accumulate the required information to analytically compute the best update. The offsets are preferably simple integer or fractional (such as ½ pixel) perturbations to the vertices. As such, it is preferable that the system 500 supports differencing of the deformed data (such as the template) and the target data (such as the image) at a number of pixel or sub-pixel shifts. For example, the host processor 508 can specify the shift amount (for instance d=1 or d=½ pixel), to enable accumulation differences not only with the target data, but also with versions shifted by ±d pixels horizontally and vertically (accumulating 9 times the statistics). For software implementations, the speed/memory-hardware tradeoff is good, where the cost of rasterizing a single pixel is still several cycles.

Another advantage of integrating the rasterization and matching stages is that the hardware can perform the visibility computation for 3D model-based tracking. The 3D model would be rendered once in order to compute the z-buffer, and then it would be rendered again to compute the (per-triangle) statistics. Rendered pixels which fail the z-buffer test would be discarded from the computation, since they are visible.

Figure 6A:
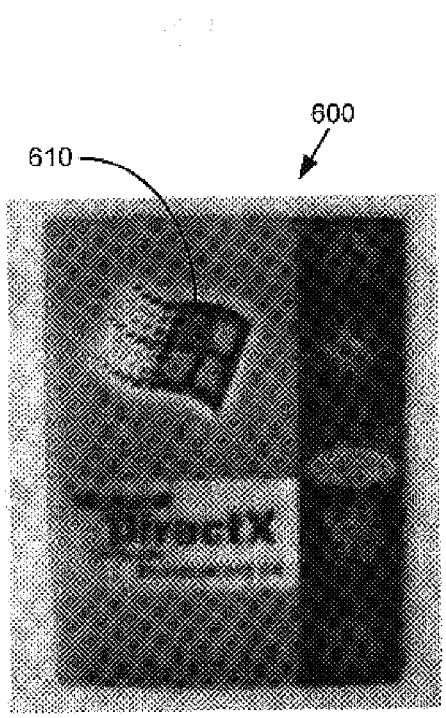
FIGS. 6A–6C are graphical images illustrating a working example of the embodiment of FIG. 5.
Figure 6B:
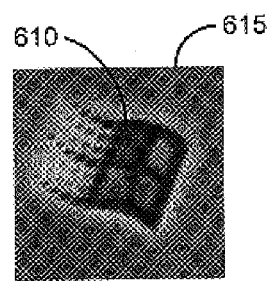
Figure 6C:
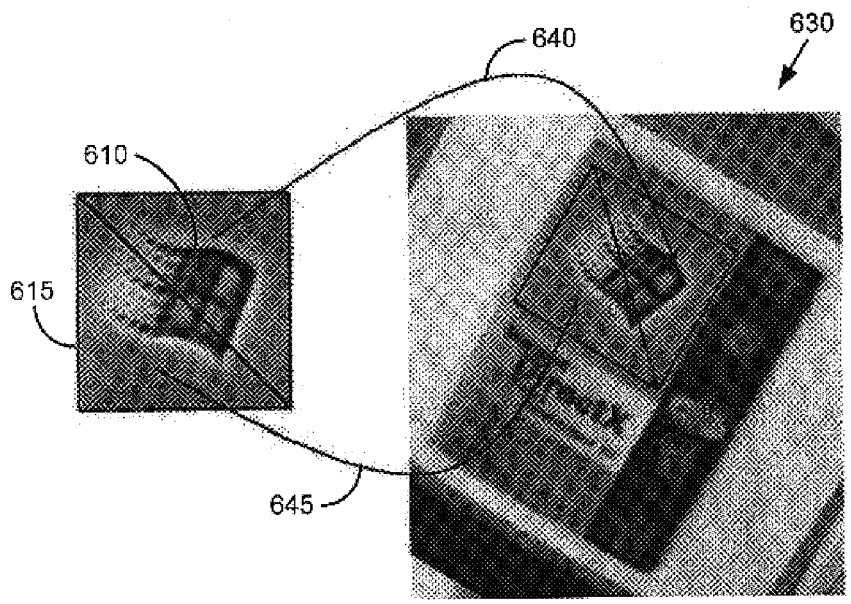

FIGS. 6A–6C are graphical images illustrating a working example of the present invention. FIG. 6A shows an image 600 from which a feature of interest 610 is to be extracted. FIG. 6B shows the feature of interest 610 as a template 615 extracted from FIG. 6A. The feature 610 is the portion of the image 600 that is to be tracked or located in subsequent input images. FIG. 6C shows a subsequent input image 630 that contains a rotated and scaled version of the feature 610. The system of the present invention detects the feature 610 by transforming either the template 615 or the image 630 (in this case, the template 615 is transformed) and gathering statistics between the transformed template 615 and the input image 630. A suitable rasterizer in accordance with the present invention, as described above, is used to transform the template 615.

Display primitives, in this case triangles, are used to transform the template 615 and locate it in the input image 630. For instance, the mapping of the triangles from template 615 to image 630 is shown by arrows 640, 645. Also, although two display primitives encompass the entire template 615 for rasterizing the template 615, additional primitives can be used for rasterizing and they do not necessarily have to encompass the entire template 615. Further, any suitable transform can be used. For example, powerful transforms, such as perspective transforms, cab be applied to the template, as well as the affine transform depicted in FIG. 6C.

V. Alternative Working Example

Figure 7:
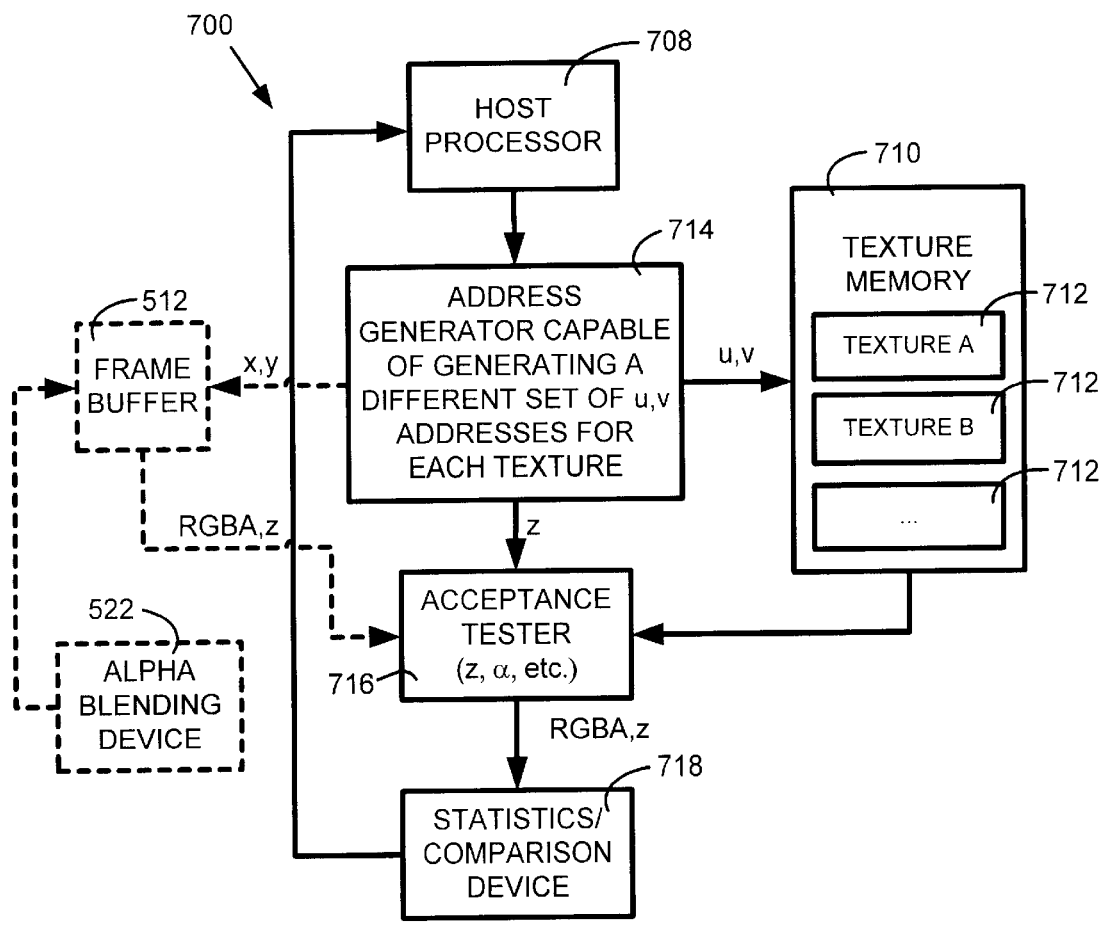
FIG. 7 is block diagram illustrating an alternative embodiment of the present invention.

FIG. 7 is block diagram illustrating an alternative embodiment of the present invention. The system 700 includes a host processor 708, a texture memory 710 with textures 712, an address generator 714, an acceptance tester 716 and a statistics comparison device 718. Optionally, the frame buffer 512 of FIG. 5 and the alpha blending device 522 of FIG. 5 can be used. The embodiment of FIG. 7 is similar to the embodiments of FIGS. 4 and 5, with the exception that the address generator 714 is capable of generating a different set of u, v addresses for each texture. Consequently, several images can be placed in the texture memory 710 as textures 712 because there are benefits to placing several images in textures, namely the arrangement allows the system 700 to scale efficiently if more than two images participate in the calculation.

In this alternative working example, the system tracks the digital objects as templates within a digital image scene with the robust and flexible processing scheme of FIG. 7. For example, in this embodiment, the address generator 714 can be a rasterization processor that resamples either the templates or digital data of the scene to be matched to the templates using a perspective transformation. In one specific embodiment of this working example, multiple images can be placed in texture memory as multiple textures. Certain statistics can be gathered between textures for normalized correlation or other statistics can be recorded for variations and subsequent forwarding to a host processor.

Specifically, as described above in FIGS. 2–6, statistics can be gathered between a resampled texture image and a corresponding portion of a frame buffer. However, alternatively, the arrangement of FIG. 7 allows gathering of statistics between textures for added flexibility. In other words, both images can participate in the comparison to benefit from the increased flexibility of texture coordinates and the increased efficiency of mipmapping and other optimizations for texture filtering. Moreover, the system of FIG. 7 is scalable. Namely, instead of performing comparisons between two images, additional images can participate in a single statistics gathering operation simply by adding more texture stages. Additional details will be described with reference to FIGS. 8–9, as described below.

Figure 8:
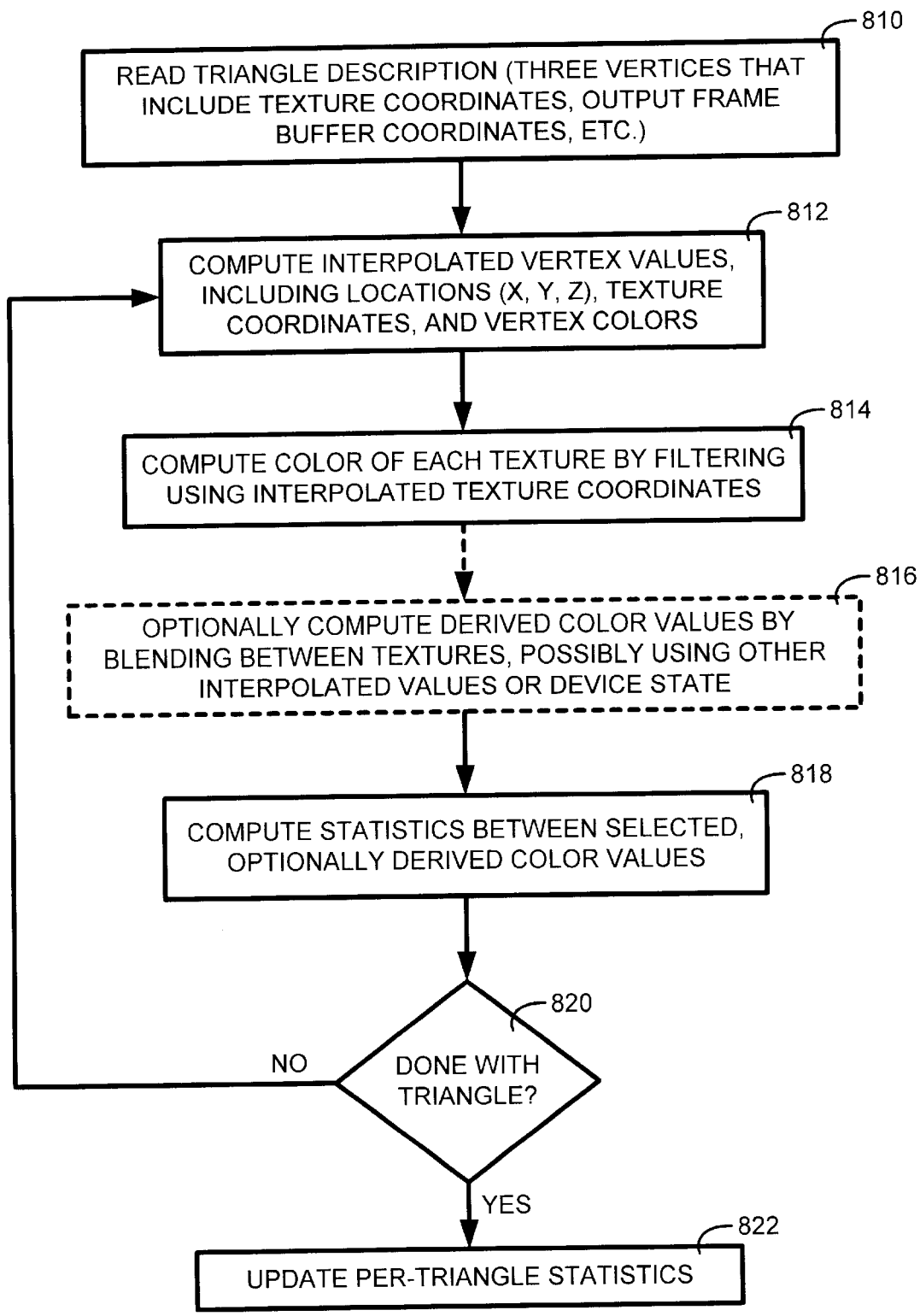
FIG. 8 is a flow diagram illustrating the operation of the alternative embodiment of FIG. 7.

FIG. 8 is a flow diagram illustrating the operation of the alternative embodiment of FIG. 7. The system 700 of FIG. 7 begins by reading the triangle description (for instance, three vertices that include texture coordinates, output frame buffer coordinates, etc.) (step 810). Second, the system 700 computes the interpolated vertex values, which includes locations (X,Y,Z), texture coordinates, and vertex colors (step 812). Third, the system 700 computes the color of each texture by filtering, which is accomplished using interpolated texture coordinates (step 814).

Optionally, the system 700 can compute derived color values by blending between textures. This can be accomplished by using other interpolated values or device states (step 816). Next, the statistics between selected, optionally derived color values are computed (step 818). It is then determined whether the system is done reading the triangle description (step 820). If not, the system 700 returns to step 812. If the system is done reading the triangle descriptions, the system 700 updates the per-triangle statistics (step 822).

FIGS. 9A–9C are graphical images illustrating a working example of the alternative embodiment of FIG. 7. Referring to FIG. 9A, a mipmap chain for use by the system 700 of FIG. 7 is shown. A mipmap chain consists of multiple copies of the same image at different resolutions, typically resolutions that decrease by 2 in width and height down to a 1×1 image. Here, a 128×128 template is shown with its full mipmap chain. This texture will be used as one input to the texture mapping engine for comparison between transformed versions of the image. A full mipmap chain typically only takes 33% more space than the original image.

Referring to FIG. 9B, normalized texture coordinates are shown. Texture coordinates are given as (u,v) coordinates that are "normalized" so that the upper left corner is referenced as floating point (0.0, 0.0) and the lower right corner as (1.0, 1.0), regardless of the texture image resolution. Hence, the center of the texture may be referenced as (0.5, 0.5) for any texture. FIG. 9C shows a pair of triangles that texture map the template image. Namely, a set of triangles is specified as 3 vertices each, where each vertex specifies the location, color, texture coordinates, and other parameters that are to be interpolated across the triangles. Here, a pair of triangles is specified to texture map the template image using four vertices. The texture coordinates of the vertices are (0.0, 0.0), (0.0, 1.0), (1.0, 0.0), and (1.0, 1.0).

Figure 9E:
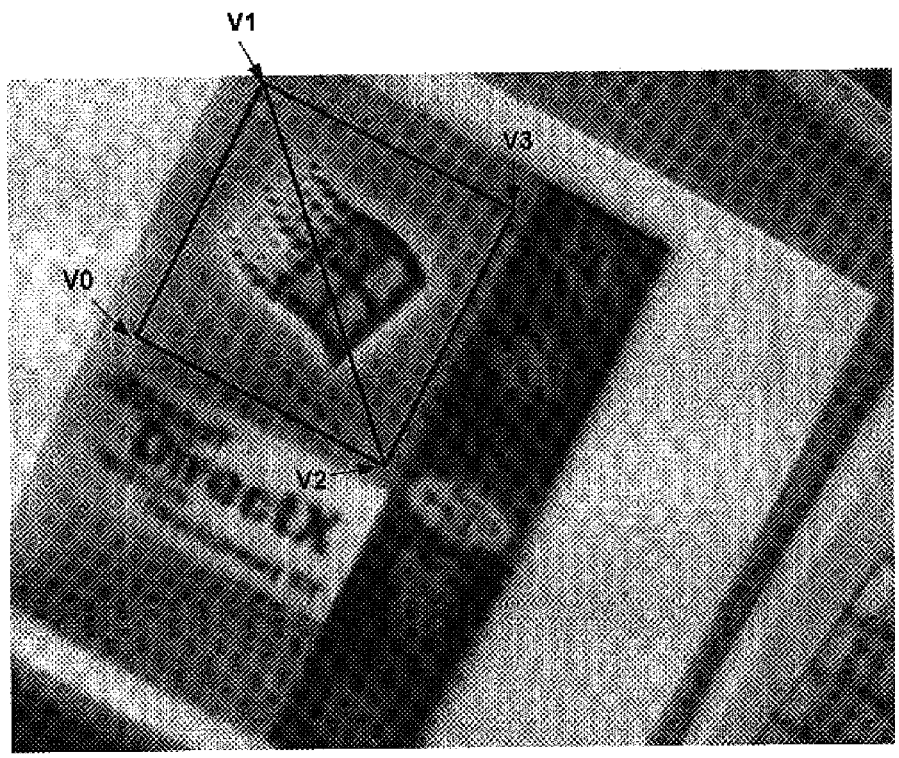

FIG. 9D shows that the image being searched is also treated as a texture. The screen-space vertices are used strictly as a way to specify the resolution at which the textures are resampled and color values are used to contribute to the statistics. This image contains a scaled and rotated version of the template to search for. Referring to FIG. 9E, here, the image and template are specified as textures to be resampled at the same resolution as the image to be searched. The vertices used to specify the two triangles are as follows:

| Vertex | Screen (x, y) | Template (u, v) | Image (u, v) |
|---|---|---|---|
| V0 | (92, 192) | (0.0, 1.0) | (0.1438, 0.4000) |
| V1 | (184, 5) | (0.0, 0.0) | (0.2875, 0.0142) |
| V2 | (271, 287) | (1.0, 1.0) | (0.4234, 0.5979) |
| V3 | (365, 100) | (1.0, 0.0) | (0.5703, 0.2083) |

The pair of triangles given will result in an exact match between the template and image if a correlation calculation is being performed between corresponding pixels.

In conclusion, the embodiment of FIGS. 7–9 details how to find a scaled and rotated version of the template (which is mipmapped, which is desired if the template is searched for under different scaling factors). It should be noted that the above description is an exemplary use of the techniques of the present invention. Using more triangles and/or different triangle specifications, the technique can also: 1) find versions of the template that have had more complicated transforms applied, such as scales, perspective transforms, or deformations (as long as the deformation can be approximated by a triangle mesh); 2) find partial versions of the template; 3) use pixel processing to generate intermediate results and gather statistics on those intermediate results; 4) write per-pixel results to the frame buffer, since the frame buffer is no longer participating in the statistics gathering computation; and 5) also, as discussed earlier, multiple images can be used as input.

Further, if concept 5) were combined with concept 3) above, for example, with 4 input images, the system could specify 4 pairs of texture coordinates, compute an absolute difference between two pairs of those images and gather statistics between the absolute differences. Other related operations would apply (e.g. computing a blend between 2 images and then gathering statistics on the differences between that blended image and a third image.

The foregoing description of the invention has been presented for the purposes of illustration and description. It is not intended to be exhaustive or to limit the invention to the precise form disclosed. Many modifications and variations are possible in light of the above teaching. For example, any pre-processing transformation, such as filtering, equalization, or edge or feature finding, could be applied to the images before they are input to the system and method of the present invention. Thus, it is intended that the scope of the invention be limited not by this detailed description, but rather by the claims appended hereto.

What is claimed is:

1. A method for comparing and matching a first set of digital data to at least a second set of digital data, comprising:

raster transforming at least one of the first set of digital data and the second set of digital data;

placing multiple images of the digital data in texture memory as multiple textures;

gathering statistics between the textures; and statistically comparing and matching the raster transformed sets of digital data to appropriately corresponding portions of each other.

2. The method of claim 1, further comprising analyzing the statistical comparisons and generating new transformations for matching the sets of data.

3. The method of claim 1, further comprising statistically comparing the raster transformed sets of digital data until a match or non-match between the first and second sets of data is achieved.

4. The method of claim 1, wherein the raster transforming comprises raster transforming at least one of the first or the second set of digital data and computing statistics on the transformation.

5. The method of claim 4, wherein statistically comparing and matching comprises analyzing the computed statistics of the transformation and calculating new and different transformations on the digital data.

6. A method for comparing and matching a first set of digital data to at least a second set of digital data, comprising:
    receiving at least one of the first and second sets of digital data into an address generator;
    placing multiple images of the digital data in texture memory as multiple textures;
    gathering statistics between the textures, rendering model transformations and accumulating statistics of the received digital data; and
    statistically comparing and matching the model transformations of the loaded set of digital data to appropriately corresponding portions of the other set of digital data.

7. The method of claim 6, further comprising statistically comparing the sets of digital data until a match or non-match between the first and second sets of data is achieved.

8. The method of claim 6, further comprising adjusting the model transformations by analyzing the statistical comparisons and generating new model transformations for matching the sets of data.

9. The method of claim 6, further comprising tracking digital templates and transforming at least one of the templates.

10. The method of claim 9, further comprising simultaneously and statistically comparing and matching images associated with the templates for tracking the templates.

11. The method of claim 10, further comprising generating addresses for the template and the image that are to be compared.

12. A system for tracking digital templates of a digital scene defined by plural images, comprising:
    a raster processor that transforms at least one of the templates;
    a texture memory that holds multiple images of the digital data as multiple textures, and wherein a unique address points to each individual image held in the texture memory;
    a statistics processor that gathers statistics between the textures; and
    a compare processor that simultaneously and statistically compares and matches images associated with the templates for tracking the templates.

13. The system for tracking digital templates of claim 12, wherein the addresses reflect transformations, including combinations of rotations, scales and perspective transforms of the template or image.

14. The system for tracking digital templates of claim 12, wherein the addresses serve as input to filtering functions that read from the images to be compared and generate color values.

15. The system for tracking digital templates of claim 12, wherein the compare processor comprises an address generator that generates addresses for the template and the image that are to be compared.

16. The system for tracking digital templates of claim 12, wherein the template comprises a group of pixels of the image and wherein the compare processor comprises an acceptance tester preprogrammed to decide whether to allow a pixel of the template to contribute to the statistics.

17. The system for tracking digital templates of claim 16, wherein if the pixel is permitted to contribute, the color values are sent to a statistics/comparison device for statistical analyses and comparison processing.

18. The system for tracking digital templates of claim 17, wherein the statistics/comparison device contains variables that are updated for each pixel based on the input color values.

19. The system for tracking digital templates of claim 12, wherein the compare processor comprises an alpha blending device that allows use of an additional color component that corresponds to the opacity of a surface for controlling the amount of color of a pixel in the source surface to be blended with a pixel in the destination surface.

20. The system for tracking digital templates of claim 12, wherein the raster processor renders the template at a plurality of offsets for allowing the raster processor to at least one of determining a desired position for the template and accumulate information to analytically compute a desired update.

* * * * *